US011235506B2

(12) United States Patent
Baumgarte et al.

(10) Patent No.: US 11,235,506 B2
(45) Date of Patent: Feb. 1, 2022

(54) METHOD, DEVICE, WORKING WHEEL, AND MOLDING STATION FOR PRODUCING FILLED CONTAINERS FROM TEMPERATURE-CONDITIONED PREFORMS

(71) Applicant: KHS GmbH, Dortmund (DE)

(72) Inventors: Rolf Baumgarte, Ahrensburg (DE); Michael Linke, Hamburg (DE); Niels Meyer, Schenefeld (DE)

(73) Assignee: KHS GmbH, Dortmund (DE)

( * ) Notice: Subject to any disclaimer, the term of this patent is extended or adjusted under 35 U.S.C. 154(b) by 2 days.

(21) Appl. No.: 16/643,531

(22) PCT Filed: Sep. 6, 2018

(86) PCT No.: PCT/EP2018/074037
§ 371 (c)(1),
(2) Date: Feb. 29, 2020

(87) PCT Pub. No.: WO2019/048557
PCT Pub. Date: Mar. 14, 2019

(65) Prior Publication Data
US 2020/0189172 A1  Jun. 18, 2020

(30) Foreign Application Priority Data
Sep. 8, 2017  (DE) ..................... 10 2017 008 446.7

(51) Int. Cl.
*B29C 49/46* (2006.01)
*B29C 49/36* (2006.01)
(Continued)

(52) U.S. Cl.
CPC .............. *B29C 49/56* (2013.01); *B29C 49/12* (2013.01); *B29C 49/36* (2013.01); *B29C 49/46* (2013.01);
(Continued)

(58) Field of Classification Search
CPC ......... B29C 49/36; B29C 49/56; B29C 49/46; B29C 2049/4694; B29C 49/4273; B29C 2049/4892
See application file for complete search history.

(56) References Cited

U.S. PATENT DOCUMENTS 4,076,071 A  2/1978  Rosenkranz et al.
5,346,386 A  9/1994  Albrecht et al.
(Continued)

FOREIGN PATENT DOCUMENTS

DE  2352926 A1  4/1975
DE  4212583 A1  10/1993
(Continued)

OTHER PUBLICATIONS

International Search Report dated Dec. 7, 2018 filed in PCT/EP2018/074037.

*Primary Examiner* — Robert B Davis
(74) *Attorney, Agent, or Firm* — Rankin, Hill & Clark LLP

(57) ABSTRACT

A method and a molding station for producing containers filled with a liquid filling material from preforms made of a thermoplastic material. Thermally conditioned preforms are molded into containers and filled with the liquid filling material, which is supplied to the preforms under pressure as a pressure medium in a multi-part mold of a molding station. The mold is movable from a closed state into an open state in order to repeatedly supply a preform and subsequently remove a completely molded and filled container. Molding of the preform into the container is performed against the mold inner wall when the mold is in the closed state. Liquid is removed from the mold between temporally successive supplying processes starting with the conversion of the mold from the closed state into the open state. A working wheel
(Continued)

Figure 1:
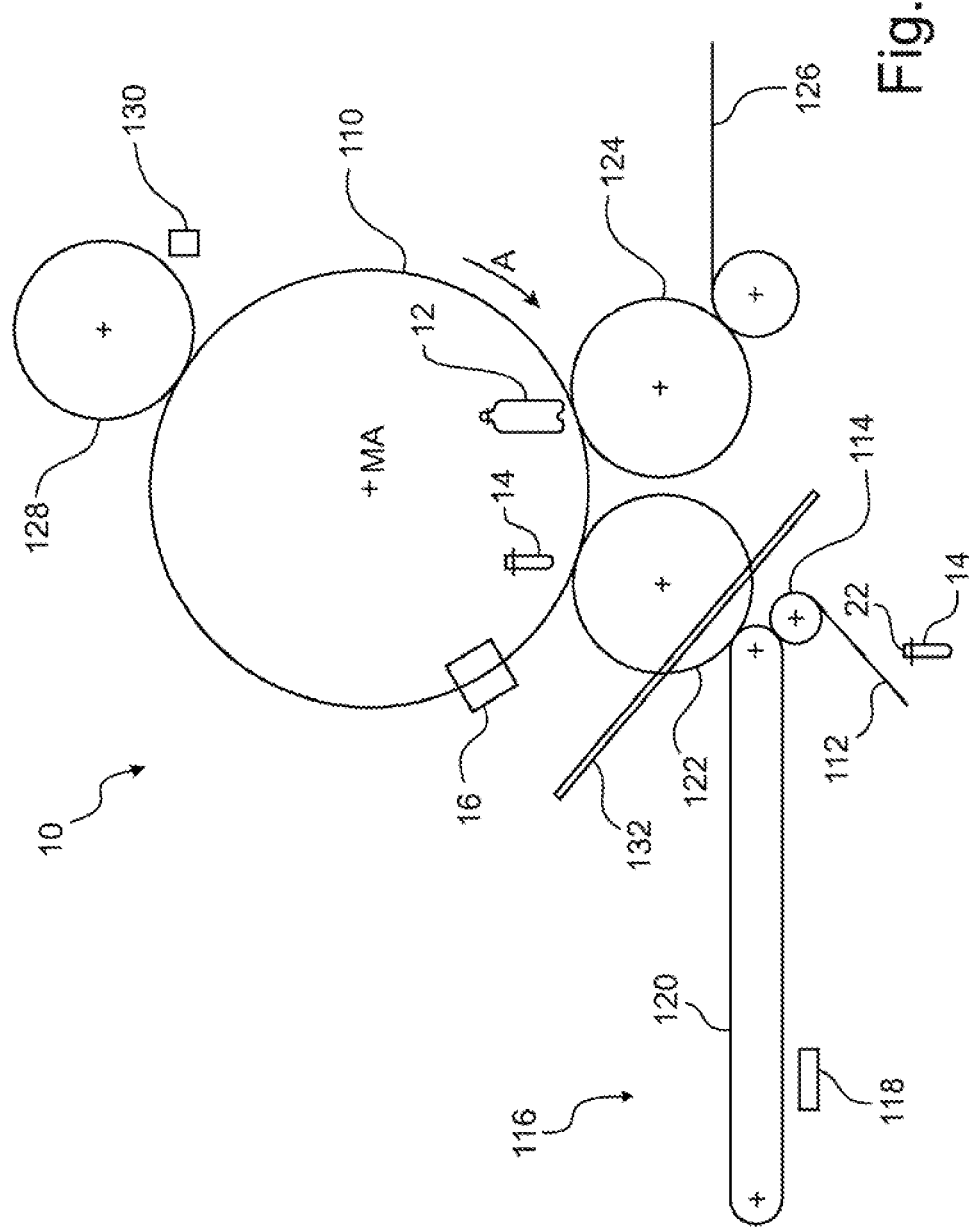

including such molding stations, and a device including such a working wheel are also disclosed.

20 Claims, 5 Drawing Sheets

(51) Int. Cl.
  *B29C 49/48* (2006.01)
  *B29C 49/56* (2006.01)
  *B29C 49/12* (2006.01)

(52) U.S. Cl.
  CPC ...... *B29C 49/48* (2013.01); *B29C 2049/4655* (2013.01); *B29C 2049/4694* (2013.01); *B29C 2049/4892* (2013.01)

(56) References Cited

U.S. PATENT DOCUMENTS

| | | | |
|---|---|---|---|
| 5,648,026 | A | 7/1997 | Weiss |
| 7,914,726 | B2 | 3/2011 | Andison et al. |
| 9,302,421 | B2 * | 4/2016 | Wilson .................... B29C 49/42 |
| 9,498,913 | B2 | 11/2016 | Haesendonckx et al. |
| 2004/0173949 | A1 * | 9/2004 | Storione ................. B29C 49/36 264/529 |
| 2007/0292550 | A1 | 12/2007 | Klatt et al. |
| 2010/0203187 | A1 | 8/2010 | Schmid et al. |
| 2011/0037187 | A1 * | 2/2011 | Winzinger .............. B29C 49/12 264/39 |
| 2012/0266567 | A1 | 10/2012 | Haesendonckx et al. |
| 2014/0196415 | A1 | 7/2014 | Drenguis et al. |
| 2016/0250798 | A1 | 9/2016 | Diesnis |

FOREIGN PATENT DOCUMENTS

| | | |
|---|---|---|
| DE | 4340291 A1 | 6/1995 |
| DE | 102004045405 A1 | 4/2006 |
| DE | 102009006508 A1 | 7/2010 |
| DE | 102010007541 A1 | 6/2011 |
| DE | 102012108978 A1 | 3/2014 |
| EP | 2335903 A1 | 6/2011 |
| EP | 2917019 B1 | 1/2017 |
| WO | 2014154659 A1 | 10/2014 |

* cited by examiner

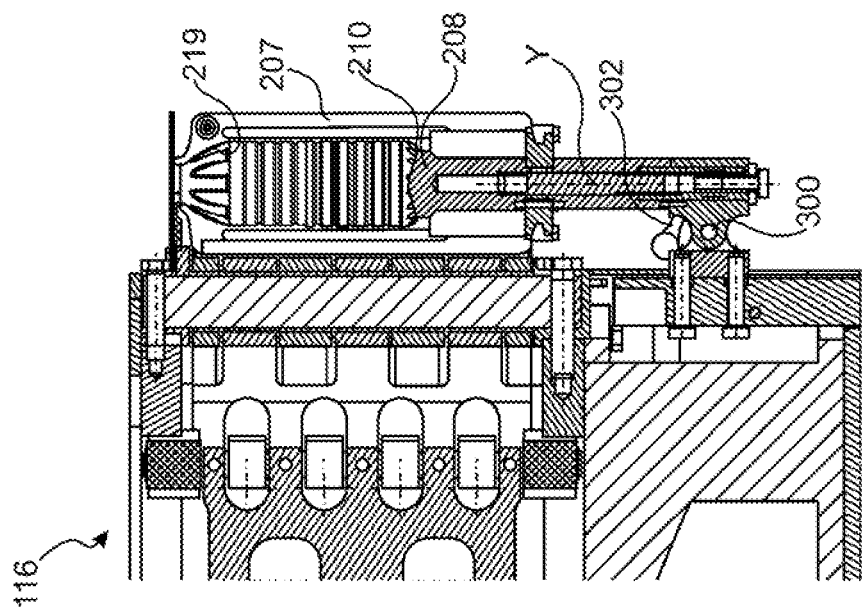
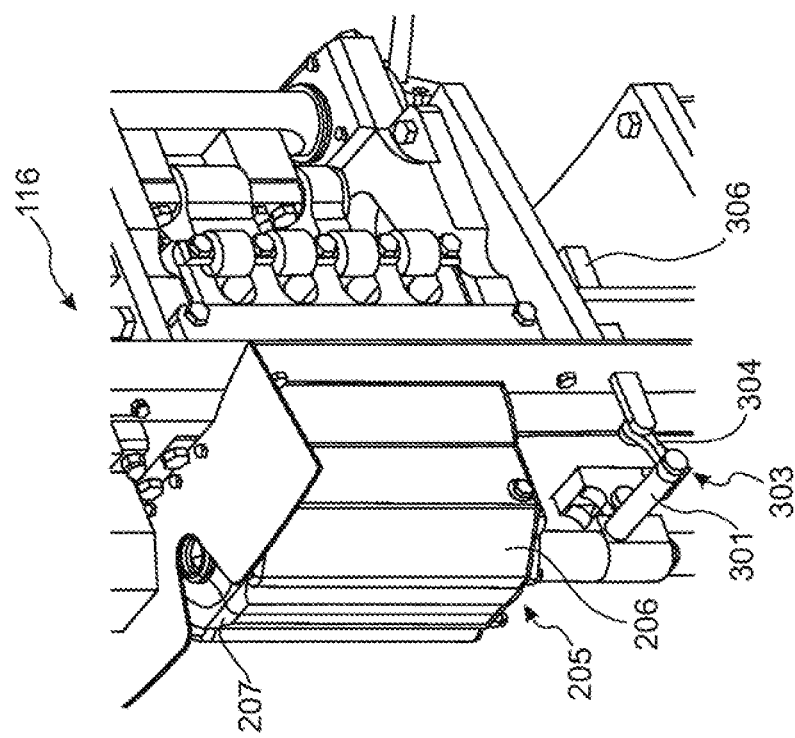
Fig. 3b
Fig. 3a

METHOD, DEVICE, WORKING WHEEL, AND MOLDING STATION FOR PRODUCING FILLED CONTAINERS FROM TEMPERATURE-CONDITIONED PREFORMS

The invention relates to a method for producing containers, which are filled with a liquid filling material, from thermally conditioned preforms made of a thermoplastic material, to a molding station for producing containers, which are filled with a liquid filling material, from thermally conditioned preforms made of a thermoplastic material, as well as to a working wheel having multiple such molding stations, and to a device for producing containers, which are filled with a liquid filling material, from temperature-conditioned preforms made of a thermoplastic material.

It is known to produce containers by blow molding from preforms made of a thermoplastic material, for example preforms made of PET (polyethylene terephthalate), wherein the preforms are fed to various processing stations within a blowing machine (DE 43 40 291 A1). A blowing machine typically comprises a heating means for controlling the temperature or thermal conditioning of the preforms and a blowing means having at least one blowing station, in the area of which the previously thermally conditioned preform is expanded to a container. Expansion is performed using a pressurized gas (compressed air) as a pressure medium, which is introduced at a molding pressure into the preform to be expanded. The process flow of such an expansion of the preform is explained in DE 43 40 291 A1. The general structure of a blowing station is described in DE 42 12 583 A1. Ways of controlling the temperature of the preforms are explained in DE 23 52 926 A1. Temperature control or thermal conditioning means that the preform is heated to a temperature suitable for blow molding and, if required, a temperature profile is applied to the preform. Blow molding of containers from preforms with the additional use of a stretching rod is also known.

According to a typical further processing method, the containers produced by blow molding are fed to a downstream filling means and filled with the intended product or filling material. This means that a separate blowing machine and a separate filling machine are used. It is also known to combine the separate blowing machine and the separate filling machine into a machine module, i.e. an interconnected blowing and filling means, wherein the blow molding and the filling are performed successively at separate machine components.

It has also been proposed to produce containers, particularly in the form of bottles, from thermally conditioned or temperature-controlled preforms and to fill them at the same time with a liquid filling material, which is supplied as a hydraulic pressure medium for expanding the preform or molding the container at a molding and filling pressure, such that the respective preform is molded into the container and filled at the same time. Such methods in which the respective container is molded and filled at the same time can also be called hydraulic molding methods or hydraulic container molding. It is known in this context that the molding process can be supported by using a stretching rod. In these methods, the preform is likewise temperature-conditioned prior to the molding and filling process.

When the containers are molded from the preforms by the filling material itself, i.e. when using the filling material as a hydraulic pressure medium, only one machine is needed for molding and filling the containers, but this machine has an increased complexity. U.S. Pat. No. 7,914,726 B2 shows an example of such a machine. Another example is shown in DE 2010 007 541 A1.

Simultaneous molding and filling of a container from a preform is performed at a molding station which has a multi-part shape, among other features. The mold must be multi-part to be able to insert a preform into the mold and to remove the molded and filled container from the mold after the forming and filling process is completed. The multi-part mold is arranged and configured in the molding station in such a manner that the mold can assume a closed state and an open state. In the closed state, the multi-part mold encloses an interior space, and in this closed state the multi-part mold forms a closed inner wall against which the preform is expanded with the mold closed by supplying the liquid filling material at a pressure into the preform and into the container parison developing from the preform until the final container shape is reached, wherein this molding process from the preform into the container is preferably supported, at least temporarily, by a stretching rod in that said stretching rod is driven into the preform and against the closed preform bottom and the stretching rod stretches the preform in the axial direction and guides the expansion at least temporarily. Furthermore, it is common that the molding stations are repetitively fed a preform, e.g. periodically at the rotation interval of a working wheel on which the molding station is disposed, and subsequently molded containers are removed from the mold. Also known, for example, are cyclically operating machines having multiple molding stations or machines which operate based on the rotary principle and have continuously rotating working wheels on which multiple molding stations are disposed at a peripheral spacing from each other and at a radial spacing from an axis of rotation of the working wheel.

Compared to the manufacturing methods and devices for blow molding preforms into containers using a pressurized gas, molding preforms into containers with simultaneous filling by using a filling material as liquid pressure medium results in peculiarities and problems which have not completely been satisfactorily resolved as yet. The present invention relates to such a peculiarity and such a problem.

The present invention relates to the problem that, when feeding the filling material as a liquid pressure medium into the preform and the resulting container parison, filling material may enter the multi-part mold, e.g. due to leakage between a molding and filling nozzle and the preform, due to filling material exiting or foaming over when pressure is relieved from the filled container, when the molding and filling nozzle is lifted, when removing the stretching rod from the container, due to bursting preforms, container parisons, or containers during the molding and filling process. Filling material can thus deposit on the multi-part mold, that is, on the inner surface of the mold. Particularly, considerable filling material quantities can accumulate in the bottom mold, which is typically cup-shaped. Such adhering filling material and such filling material accumulation result in a bottle quality considered inadequate, since on the one hand the undesired filling material causes local cooling of the mold and the abutting container parison, and on the other hand it disturbs or prevents the developing container parison from abutting to the inner mold wall because the filling material cannot be displaced.

Prior art has no solutions to this problem and does not describe the problem because this problem is specific to the process of simultaneously molding and filling of containers from preforms.

It is therefore the object of the present invention to provide a method, a device, a working wheel, and molding stations for producing filled containers from temperature-conditioned preforms which solve the problem described above while still allowing high molding and filling speeds.

This object is achieved by a method as claimed herein. This object is further achieved by a device as claimed herein, by a working wheel as claimed herein, and by a molding station as claimed herein. Advantageous embodiments of the method, the molding stations, the device, and the working wheel are provided in the dependent claims.

In the solutions proposed by the method according to the invention and by the molding station according to the invention a process step of removing liquid from the multi-part mold is performed at least temporarily between temporally successive feeding processes of preforms. The molding station comprises to this end a liquid removal means for removing liquid from the mold between temporally successive feeding events involving preforms. Particularly, according to the invention, the process step of removing liquid from the mold is performed starting when the mold is converted from the closed to the open state. It is generally possible that liquid is removed continuously and not only in specific process phases.

It is possible, according to the invention, that the process step of removing liquid from the mold is performed in every molding and filling process cycle to reliably remove liquid from the mold. This makes it dispensable, for example, to detect the liquid adhering to or accumulated in the mold with sensors, and it also makes sensor detection of bursting containers dispensable, wherein such detection may even be provided when performing liquid removal in each molding and filling cycle. Bursting can for example be determined from the pressure curve of the supplied molding fluid, based on a sudden pressure drop. But it is also possible that the process step of liquid removal is not provided in each molding cycle, but for example after a predetermined number of manufacturing cycles, optionally supplemented by performing the process step of removing liquid when an event occurs, such as the bursting of a container in the mold. It is also possible that the process step of removing liquid lasts for multiple working wheel rotations. When a container bursts, it can be advantageous not to feed new preforms to the affected molding station for several rotations, but instead apply a drying fluid to the station for several rotations of the working wheel, for example. The above explanations of the method apply likewise to the liquid removal means of the molding station according to the invention.

Furthermore, the multi-part mold has a bottom mold and at least two lateral half-molds. This mold structure is in principle known from the field of blow molding machines. The bottom mold and the lateral half-molds are movable relative to each other and convertible from a closed state into an open state. In the closed state, these elements of the multi-part mold adjoin along dividing lines. It is further preferred that the bottom mold is disposed vertically below the lateral half-molds, such that containers are produced in which the closed bottom is at the bottom and the container opening is at the top in the vertical direction. This at the same time results in a tendency that filling material residues can accumulate in the bottom mold.

Advantageously, the bottom mold performs a tilting movement when converting into its open state. The tilting movement can also be separated from the opening movement, for example performed only when required. Performing a tilting movement means that the bottom mold is oriented in a specific direction in the closed state. When opening the mold or until the open state is reached or upon reaching the open state, the bottom mold is tilted in a direction deviating therefrom. This is particularly advantageous in devices and methods which operate based on the rotary principle. The tilting movement should be directed radially outwards, and the centrifugal force supports pouring the filling material out of the bottom mold.

An angle smaller than 90°, preferably smaller than 45°, should be selected as the tilting angle.

Further preferred in all variants mentioned above is that the tilting movement is temporally coupled to the opening of the mold. The tilting movement of the bottom mold mentioned above could be performed by a respective tilting drive of the molding station, wherein it is deemed advantageous for all variants mentioned above that the drive for the tilting movement is mechanically coupled to the drive for opening the mold, particularly to the drive which moves the bottom mold from the closed position into the open position. This avoids an additional drive, the opening movement of the bottom mold and the tilting movement would automatically be temporally coordinated, and existing molds could be mechanically retrofitted for performing a tilting movement.

All movements of the mold could be motion-coupled, that is, opening and closing the lateral molds, the bottom mold, and the tilting movement. But the movement of the bottom mold can also be uncoupled from the movement of the lateral molds. One advantage of an uncoupled tilting movement of the bottom mold by a drive of its own would be, for example, that the two lateral half-molds could be brought into their closed state while a drying fluid is blown into the bottom mold, for example. The interior surfaces of the half-molds would be protected from splashing filling material. The drive could be configured, for example, as a driver which interacts with a control curve.

The invention explained above can particularly advantageously be used in methods which are performed with a continuously rotationally driven working wheel. Multiple molding stations are disposed on this working wheel with a multi-part mold and spaced apart from each other in the peripheral direction and at a radial spacing from an axis of rotation. Such methods based on the rotary principle allow a particularly high molding and filling speed.

The configuration of the liquid removal means and the performance of the process step of removing liquid open up many additional options, some of which will be explained below. It is possible and advantageous that the options explained below are implemented in combination with each other.

Advantageously, the process step of removing liquid could be further improved by dividing the multi-part mold into a bottom mold and lateral molds in such a manner that the dividing line between the bottom mold and the lateral molds at least in sections includes the lowest points of the bottom mold in the vertical direction. In other words, the bottom mold has at least one of its lowest points in the vertical direction on the dividing line. This ensures that any filling material accumulated in the bottom area of the mold automatically drains off when the mold opens, because any filling material located at the lowest points of the bottom mold in the vertical direction must flow off. Very different variants are possible depending on the contour of the container to be produced in its bottom region. In the case of a champagne bottom, the bottom mold could have a ram-shaped appearance with a mushroom head like appearance. If the container bottom is to have multiple standing feet in its bottom region, as is known, for example, from pentaloid bottoms, the deepest points of one, preferably even of all container feet should lie on the dividing line between the bottom mold and the lateral molds. This prevents that the bottom mold as a whole or in partial regions thereof has convexly shaped trough-like collection areas for filling material.

If the multi-part mold is divided as explained above, advantages particularly result whenever the method is based on the rotary principle and the deepest points are radially as far outside as possible. Due to the centrifugal force, the filling material is automatically forced radially outwards and removed from the bottom mold.

Alternatively, or optionally in addition, liquid draining means may be provided at the lowest points in the bottom mold of the multi-part mold. Alternatively, or in addition, such liquid draining means can also be provided in local minima, that is, in convexly shaped sections, which represent trough-like collection areas for filling material. These can for example be outlets, which may for example be equipped with a valve, for example a self-closing valve, or which are equipped with a porous insert, wherein said insert is to allow drainage of filling material but prevent the undesirable formation of impressions in the container bottom. The outlets described above could for example be connected to a suction means to accelerate the draining of liquid. The liquid removal means mentioned could be designed as continuously liquid draining or intermittently operating. With these liquid draining means described above, bottom shapes known from prior art could be modified without having to change the division into a cup-shaped bottom mold and lateral molds known from prior art.

As to the tilting movement of the bottom mold explained above, it is advantageous for all embodiments mentioned and all combinations thereof if the bottom mold is pivotally coupled to a tilt bearing which is disposed at a vertical spacing below the lateral half-molds. It is further preferred that the tilting movement is cam-controlled.

It is further preferred that a drying means is provided. This drying means is to at least temporarily dry the open mold, particularly the open bottom mold, by applying a gaseous drying fluid and/or thermal energy to it. This drying means could for example be compressed air, exhaust heat from the furnace, sterile air, or heat radiation directed at the open mold, particularly the bottom mold, to remove residual liquid in addition to the process step of removing liquid, and to free the inner mold wall as best as possible from any filling material residues.

Advantageously, the mold, particularly the bottom mold, is on its inner mold wall at least in sections designed with a hydrophobic surface and/or with a nanostructured surface preventing the adherence of liquid to bring about the lotus effect. This facilitates and supports the removal of liquids because they adhere less strongly to the inner mold wall and can therefore be removed more completely and in a shorter time, regardless of the way in which this liquid is removed. A surface can be designated a hydrophobic surface if the contact angle between a liquid and a surface is large. A contact angle (also called wetting angle) is an angle which a liquid droplet forms with the surface of a solid on said surface. In the special case of using water as liquid, a surface with contact angles of about 90° or more is deemed hydrophobic. If the angles are very large (approx. 160°), this is also called lotus effect. Herein the object is molding containers by means of a filling material, e.g. by beverages. These beverages will have water-like properties. Advantageously, the surface is selected such that the contact angle is at least 90°, preferably at least 135°, more preferably at least 160°, in each case based on water as the liquid.

Figure 2:
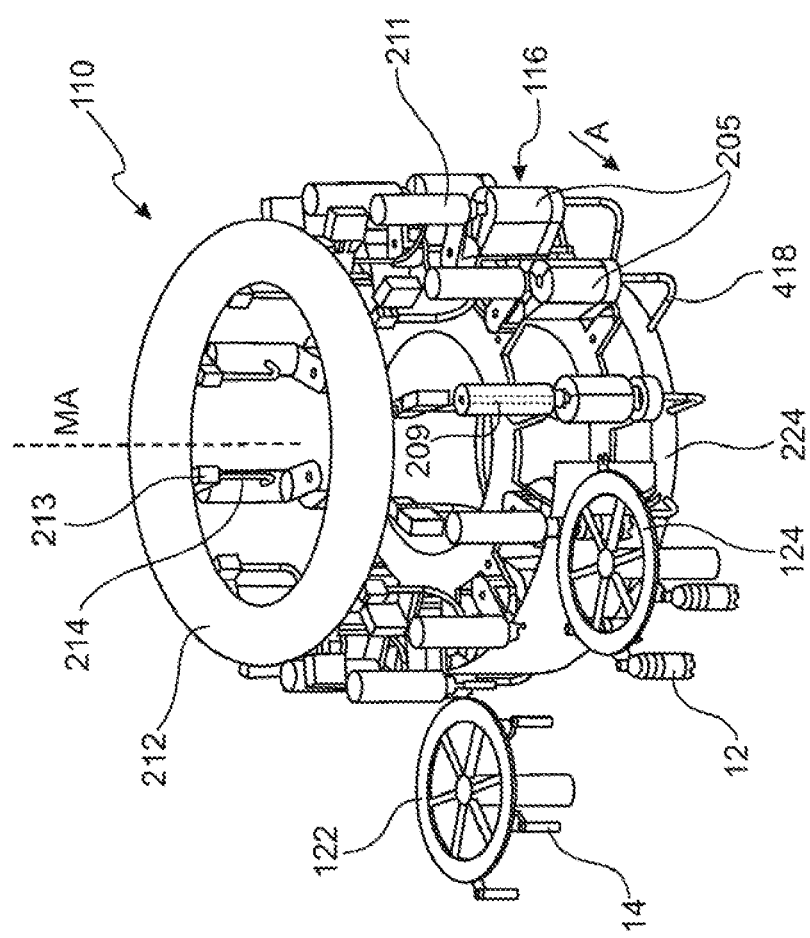
Figure 4B:
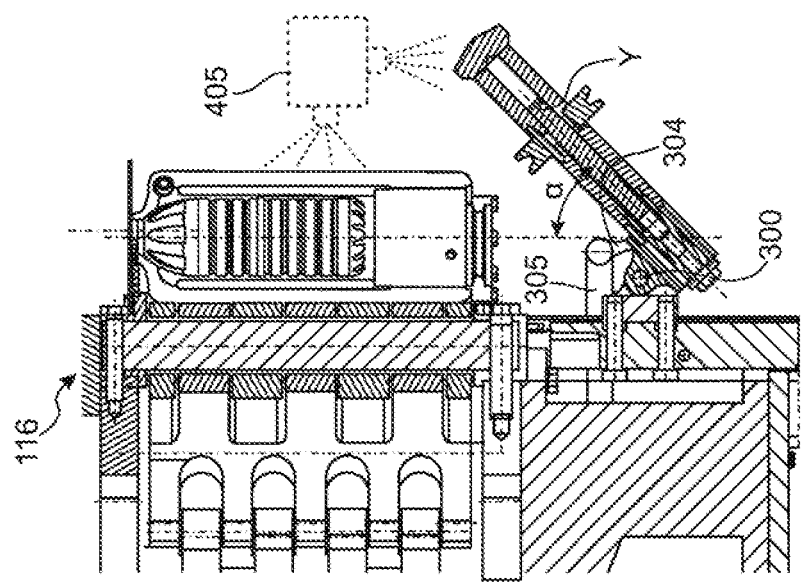
Figure 4A:
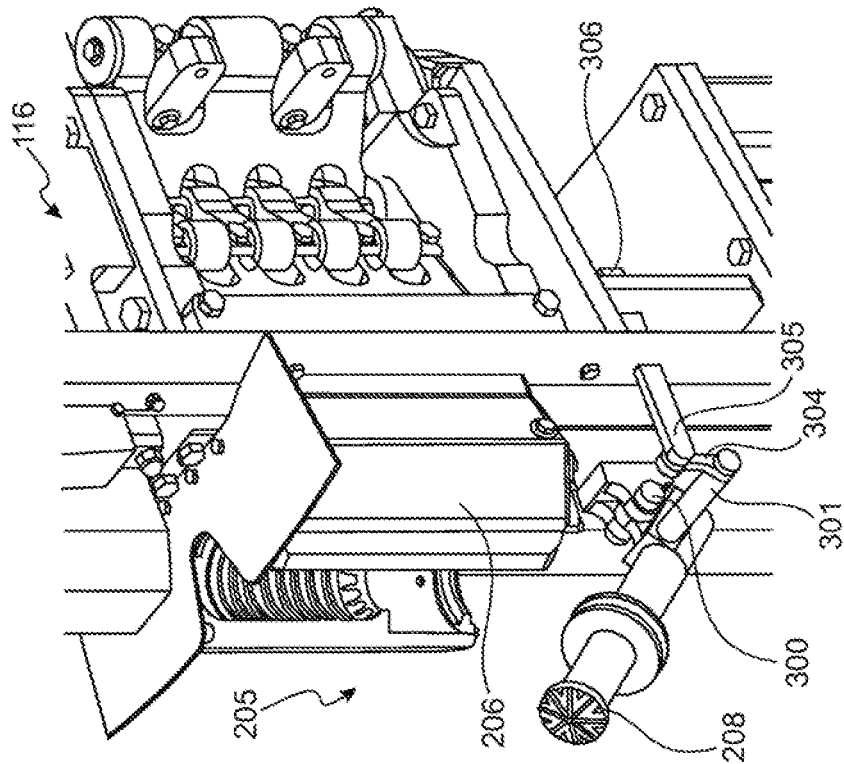
Figure 5:
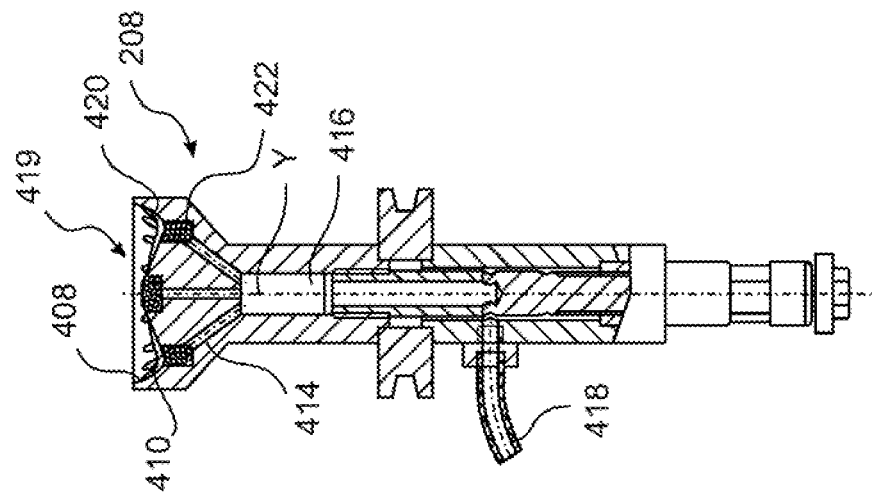
Figure 6:
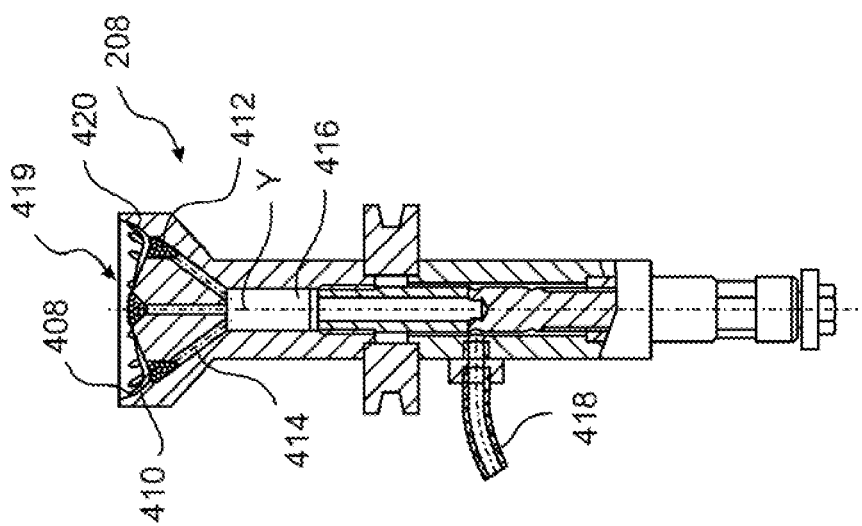

Other advantages, features, and details of the invention can be derived from the following description of exemplary embodiments with reference to schematic drawings. Wherein:

FIG. 1 shows a highly schematic representation of a mold filling device,

FIG. 2 shows a schematic representation of multiple molding stations disposed on a rotationally driven working wheel, FIGS. 3*a*, 3*b* show a perspective view and a sectional view through a molding station according to an exemplary embodiment, FIGS. 4*a*, 4*b* show a perspective view and a sectional view of the exemplary embodiment shown in FIGS. 3*a*, 3*b* at a later process time, FIG. 5 shows a partial sectional view of another exemplary embodiment of a bottom mold with a means for removing liquid or filling material, respectively, and FIG. 6 shows of a partial sectional view as in FIG. 5 of another exemplary embodiment of a bottom mold with a means for removing liquid or filling material.

The structure of a combined molding and filling machine 10, which is in principle known from prior art, is shown in FIG. 1. The figure shows the preferred configuration of such a molding and filling machine 10 of the type of a rotary machine having a rotating working wheel 110 which carries multiple molding stations 16. Schematically represented preforms 14 are continuously fed from a feeding means 112 to a heating means 116 using a transfer wheel 114. In the area of the heating means 116 in which the preforms 14 are transported along a heating path and thermally conditioned in the process, the preforms 14 may be conveyed, for example, with their mouth sections 22 in a perpendicular direction upwards or in a perpendicular direction downwards, depending on the application. The heating means 116 is for example equipped with heating elements 118, which are disposed along a transport device 120 to form a heating path. A rotating chain with transport pins for holding the preforms 14 can for example be used as the transport device 120. IR radiators or light emitting diodes or NIR radiators are for example suitable as heating elements 118. Since manifold types of such heating means are known from prior art and the design details of the heating means are not essential for the present invention, we can omit a detailed description and refer to prior art, particularly prior art with respect to heating means of blow molding and stretch blow molding machines.

After sufficient temperature conditioning, the preforms 14 are transferred by a transfer wheel 122 to a working wheel 110 which is rotatably mounted, i.e. rotationally drivable about a vertical machine axis MA, or transferred to molding stations 16, which are disposed in the working wheel 110 in a peripherally distributed manner. The working wheel 110 is equipped with a plurality of such molding stations 16, in which the preforms 14 are both molded into the schematically represented containers 12 and the containers 12 are filled with the intended filling material. Each container 12 is molded simultaneously with being filled, wherein the filling material serves as pressure medium for molding. For the sake of simplicity, FIG. 1 only shows one such molding station 16.

After molding and filling, the completely molded and filled containers 12 are removed from the working wheel 110 by a removal wheel 124, transported further, and fed to a discharge path 126. In operation, the working wheel 110 rotates continuously at a desired rotational speed. In the course of a rotation, a preform 14 is inserted into a molding station 16, the preform 14 is expanded into a container 12 and filled with filling material and optionally stretched, if a stretching rod is provided, and the container 12 is removed from the molding station 16.

According to the embodiment in FIG. 1, the working wheel 110 is also fed schematically represented closing caps 130 via an input means 128. This makes it possible to perform closing of the containers 12 on the working wheel 110 and to handle finished molded, filled and closed containers 12 using the removal wheel 124.

Various thermoplastic materials can be used as material for the preforms 14. Examples include polyethylene terephthalate (PET), polyethylene (PE), polyethylene naphthalate (PEN), or polypropylene (PP). Dimensioning and weight of the preforms 14 are adjusted to the size, the weight, and/or the design of the containers 12 to be produced.

Typically, a plurality of electric and electronic components is disposed in the area of the heating means 116. In addition, the heating elements 118 are equipped with moisture-sensitive reflectors. Since the containers 12 are filled with the liquid filling material and molded in the area of the working wheel 110, care should preferably be taken that unintended moisture input into the area of the heating means 116 is prevented to avoid electrical problems. This can be done by means of a bulkhead means 132, which at least provides protection against splashing. In addition, transport elements used for the preforms 14 in the area of the transfer wheel 122 may be suitably temperature controlled or exposed to pressurized gas pulses in such a manner that the adhering moisture cannot enter the area of the heating means 116.

The preforms 14 and/or the containers 12 are preferably handled using tongs and/or clamping or socket pins which apply a holding force at least to parts of the mouth section 22 from inside or outside. Such handling devices are also sufficiently known from prior art.

FIG. 2 shows a somewhat more detailed schematic view of the working wheel designated in FIG. 1 by the reference numeral 110 and having multiple peripherally distributed molding stations 116 which rotate with the working wheel. The working wheel 110 is rotationally driven about the working wheel axis MA in the direction of the arrow A, i.e. clockwise. The radial spacing and the peripheral spacing between neighboring molding stations are selected equal for all stations to ensure smooth rotation.

Each molding station 116 comprises a mold 205, which in the example shown is composed of a bottom mold 208 and two lateral molds 206, 207. A molding and filling head 211 is disposed above the mold 205 for each station. To perform the molding and filling process, the molding and filling head 211 is for example lowered to the closed mold 205 and brought into sealing contact with a preform 14 received in the closed mold 205. In principle, the structure of such a working wheel 110 having multiple molding stations 116 rotating with it is known from prior art and does not require a more detailed description.

As a rule, each molding station 116 also has a stretching rod 209 which is axially movable in the vertical direction, i.e. in the longitudinal direction of the preform 14, and whose lower rounded end is initially at least temporarily moved downwards in a controlled manner to contact the closed bottom of the preform 14 to be molded and then to the bottom of the developing container 12, thereby guiding the molding or stretching of the preform 14 into the respective container 12. The liquid filling material can be introduced into the preform 14 or into the increasingly developing container parison via the stretching rod 209, e.g. via an inflow duct which is formed in the interior of the stretching rod 209 and has bottom-side openings.

An annular reservoir 212 is provided at the working wheel 110, which reservoir is at least partially filled with the filling material pressurized with the molding and filling pressure during the molding and filling operation of the working wheel 110 and is connected to the molding and filling heads 207 via lines 214 comprising valves 213. An annular conduit 224 is disposed under the molding and filling stations 116 at the working wheel 110, which serves, among other things, as a collecting line or collecting container for collecting and draining filling material residues which must be removed from the molding stations 116. This is preferred compared to a solution in which said filling material can freely drop to the floor, wherein the collecting line is merely optional.

The preforms 14 are fed to the working wheel 110 via a transport system 122, wherein each molding station 116 is given a preform 14 in the exemplary embodiment shown. The molded and filled containers 12 are removed via a star transporter 124 after the molding and filling process is completed and after opening the molds 205.

Filling material which may have an interfering effect in subsequent molding and filling processes can accumulate in the molds 205 due to bursting preforms 14 or bursting container parisons or bursting containers 12, and further due to leakages on the path of the filling material and filling material residues adhering to the molding and filling heads 207 and, if applied, to the stretching rod 209, which residues can drip into the molds 205. According to the invention, the molding stations 116 are therefore provided with means to remove filling material.

In terms of process engineering, filling material residues are removed in a process step.

Exemplary embodiments of such means for removing filling material from the molds 205 will be shown below, wherein these molds 205 do not necessarily have to be disposed in a rotating manner on a working wheel 110.

FIG. 3a shows a perspective view of an exemplary embodiment of a mold 205 of a molding station 116. Other details can be seen in the sectional view of FIG. 3b through a partial area of such a molding station 116.

As already indicated in FIG. 2, the mold 205 is composed of two lateral half-molds 206 and 207, which together with the bottom mold 208 enclose an interior volume and form an inner surface 219 of the mold 205 in the closed position of the mold shown in FIGS. 3a and 3b. The section line of FIG. 3b runs centrally through the closed blow mold 205 along the connection plane of the two lateral half-molds 207 and 206, such that a viewer looks into the lateral half-mold 207 in the representation of FIG. 3b.

In the closed state of the mold 205 shown, the bottom mold 208 and the lateral half-molds 207 and 206 are in close contact with each other, wherein the dividing line between the bottom mold 208 and the lateral half-mold 207 was assigned the reference numeral 210 in FIG. 3b. In the exemplary embodiment shown, this dividing line 210 is vertically at the lowest area of the inner surface 219 of the mold 205, such that any accumulated filling material will automatically drain from the mold 205 when the mold 205 is opened.

The drive kinematics of the lateral half-molds 206, 207 and the bottom mold 208 shown in the right-hand portion of FIG. 3a in principle corresponds to a design already known from applicant's prior art and does not need a detailed description. Instead, we make reference to FIG. 5 of DE 10 2004 045 405 and the associated description in paras. [0047]-[0052] of the associated laid-open patent application of Apr. 13, 2006. We further make reference to FIGS. 5-8 of DE 10 2009 006 508 A1 and the associated description in paragraphs [0056]-[0084] regarding coupling an opening movement of a mold with a lowering movement of a blow nozzle, which in this case is configured as a molding and filling head. We further make reference to FIGS. 4a to 4c and 5a, 5b and the associated description in paras. [0051]-[0066] of EP 2 917 019 B1. From these cited passages, which are herewith made the subject matter of the present description, a person skilled in the art can derive sufficient information to design an opening and closing of the mold 205.

The design shown in FIGS. 3a, 3b and 4a, 4b has a distinctive feature with respect to the designs which were in principle already disclosed in prior art in that the bottom mold 208 in the open position shown in FIGS. 4a and 4b is tilted relative to the closed position shown in FIGS. 3a and 3b. This means that the longitudinal axis of the bottom mold 208 is displaced by an angle α when comparing the closed state and the open state. In a molding station 116 disposed on a working wheel 110, this tilting should be in a radially outward direction, particularly leveraging the existing centrifugal effect. Tilting the bottom mold 208 in the exemplary embodiment shown is implemented in that the region of the bottom mold 208 facing away from the lateral half-molds 206, 207 is mounted on a pivot axis 300. A pivot control lever 301 extends transversely to the longitudinal axis Y of the bottom mold 208. A transfer lever 304 is pivotably hinged to the free end 303 of said control lever, while its second end 305 is hinged a control lever 306. This control lever 306 is movably disposed to operate the pivoting movement of the bottom mold 208 in the radial direction of the working wheel 110. Operational movement of the control lever 306 may for example be cam-controlled by an actuator or in a manner not shown here by mechanically coupling it with opening and closing movement of the lateral half-molds 206, 207, which is known as such from prior art. The respective prior art was mentioned in the preceding paragraph.

The exemplary embodiment shown in FIGS. 3a, 3b, 4a, and 4b includes both a pivotability of the bottom mold and a discharge of the filling material as a result of dividing the mold into a bottom mold 208 and lateral half-molds 206, 207 in such a manner that the dividing line 210 in between is at the lowest point of the inner surface 219 of the mold 205. Both effects may favorably complement each other.

FIG. 4b shows an outline in dashed lines of a drying means 405, which may for example act on the bottom mold 208. This drying means 405 may additionally and/or alternatively also act on one or both lateral half-molds 206, 207. The general introduction to this description mentions various different drying means, and the schematically shown drying means 405 can be designed accordingly.

FIG. 5 shows a sectional view of a bottom mold 208. Outlet openings 410 are provided in the lowest portions of the inner contour 408 of the bottom mold 208, which connect to a porous material 412 in the area immediately adjacent to the inner contour 408. The porous material 412 is to allow the filling material to pass through but to prevent disturbing impressions on a container wall adjoining there. Discharge channels 414 extend from said porous material 412 to a collecting line 416 formed in the interior of the blow mold 208, which line is in communication with a suction line 418. The above bottom mold 208 has an inner contour 408 for molding a container bottom having multiple feet 420. It is preferred that a liquid discharge line 410 is provided in the area of the feet 420, which line is equipped with a porous material 412.

FIG. 6 shows an alternative design variant, wherein the only difference from FIG. 5 is that no porous material is provided but that the discharge lines 410 are equipped with a valve 422.

The inner surface 419 of the bottom mold 208 may for example have hydrophilic properties to improve the discharge of filling material. The inner surface 419 may also have such a surface structuring that a lotus effect occurs, which reduces the adherence of liquid.

The invention claimed is:

1. A method for producing containers, which are filled with a liquid filling material, from preforms made of a thermoplastic material, wherein each preform is thermally conditioned and subsequently molded into the container and filled with at least one liquid filling material which is supplied to the preform under pressure as a pressure medium during a molding and filling phase in a multi-part mold of a molding station, wherein the mold is convertible from a closed state into an open state in order to repeatedly supply a preform and subsequently remove a completely molded container, wherein the molding process into the container is performed against the mold inner wall when the mold is closed, wherein the mold is formed of a bottom mold and at least two lateral mold elements, wherein the bottom mold and the at least two lateral mold elements are movable relative to each other and in the closed state adjoin along dividing lines, wherein the bottom mold is disposed vertically below the at least two lateral mold elements, and wherein a process step of removing liquid from the mold is performed at least temporarily between temporally successive feeding processes starting with the conversion of the mold from the closed state into the open state such that the bottom mold performs a tilting movement during or after the conversion into the open state.

2. The method according to claim 1, wherein the preform is at least temporarily guided and stretched in an axial direction of the preform by a stretching rod during the molding process of the preform into the container.

3. The method according to claim 1, wherein the method is performed with a continuously rotationally driven working wheel on which multiple molding stations are disposed, each being provided with a multi-part mold and spaced apart from each other in a peripheral direction of the working wheel and at a radial spacing from an axis of rotation of the working wheel.

4. The method according to claim 3, wherein the tilting movement is directed radially outwards.

5. The method according to claim 1, wherein the dividing line between the bottom mold and the at least two lateral elements are selected such that the lowest points of the bottom mold in the vertical direction lie at least in sections on said dividing line.

6. The method according to claim 1, wherein a liquid draining means is disposed in a lowest-lying area of the mold and/or in a local minimum.

7. The method according to claim 1, wherein a gaseous drying fluid and/or thermal energy is applied by a drying means to the bottom mold in the open state.

8. The method according to claim 1, wherein performing the tilting movement is temporally coupled to the opening of the mold.

9. The method according to claim 8, wherein the drive for the tilting movement is mechanically coupled to the drive which moves the bottom mold from the closed position into the open position.

10. The method according to claim 8, wherein the opening and closing of the at least two lateral mold elements, the bottom mold, and the tilting movement of the bottom mold are motion-coupled.

11. A molding station for producing containers, which are filled with a liquid filling material, from preforms made of a thermoplastic material, wherein the molding station comprises a molding and filling head and a multi-part mold, wherein the molding station is configured to mold and fill a thermally conditioned preform into the container with the liquid filling material which is supplied to the preform under pressure as a pressure medium during a molding and filling phase in the mold, wherein the mold is convertible from a closed state into an open state in order to repeatedly supply a preform and subsequently remove a completely molded container, wherein the molding process into the container is performed against the mold inner wall when the mold is closed, wherein the mold is formed of a bottom mold and at least two lateral mold elements, wherein the bottom mold and the at least two lateral mold elements are movable relative to each other, and in the closed state adjoin along dividing lines, wherein the bottom mold is disposed vertically below the at least two lateral mold elements, wherein the molding station further comprises a liquid draining means for removing liquid from the mold between temporally successive preform feeding processes starting with the conversion of the mold from the closed state into the open state such that the bottom mold performs a tilting movement during or after the conversion into the open state.

12. The molding station according to claim 11, wherein the molding station further comprises a stretching rod and is configured to at least temporarily guide and stretch the preform by means of the stretching rod in an axial direction of the preform during the molding process of the preform into the container and during its filling.

13. The molding station according to claim 11, wherein the dividing line between the bottom mold and the at least two lateral mold elements is selected such that the lowest points of the bottom mold in the vertical direction lie at least in sections on said dividing line.

14. The molding station according to claim 11, wherein the liquid draining means is disposed in a lowest-lying area of the mold and/or in a local minimum.

15. The molding station according to claim 11, wherein the molding station comprises a drying means, which is disposed and adapted for applying, at least temporarily, a gaseous drying fluid and/or heat energy to the bottom mold in the open state.

16. The molding station according to claim 11, wherein the bottom mold is provided with a hydrophobic surface and/or with a nanostructured surface on its inner mold wall at least in sections that reduces the adherence of liquid.

17. The molding station according to claim 11, wherein performing the tilting movement is temporally coupled to the opening of the mold such that the drive for the tilting movement is mechanically coupled to the drive which moves the bottom mold from the closed position into the open position.

18. The molding station according to claim 17, wherein the opening and closing of the at least two lateral mold elements, the bottom mold, and the tilting movement are motion coupled.

19. A working wheel having multiple molding stations for producing containers, which are filled with a liquid filling material, from preforms made of a thermoplastic material, wherein the working wheel is continuously rotationally driven, wherein the molding stations are disposed on the working wheel spaced apart from each other in peripheral direction of the working wheel and at a radial spacing from an axis of rotation of the working wheel, and wherein at least one of the molding stations disposed on the working wheel is a molding station according to claim 11.

20. A device for producing containers, which are filled with a liquid filling material, from preforms made of a thermoplastic material, the device comprising a heating means for temperature conditioning the preforms and a working wheel according to claim 19.

\* \* \* \* \*